(12) United States Patent
Akimoto

(10) Patent No.: US 9,710,035 B2
(45) Date of Patent: Jul. 18, 2017

(54) IC CHIP

(71) Applicant: KYOCERA Document Solutions Inc., Osaka (JP)

(72) Inventor: Tadaaki Akimoto, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/183,763

(22) Filed: Jun. 15, 2016

(65) Prior Publication Data

US 2016/0378152 A1  Dec. 29, 2016

(30) Foreign Application Priority Data

Jun. 25, 2015  (JP) .................. 2015-127622

(51) Int. Cl.
*G06F 11/00* (2006.01)
*G06F 1/26* (2006.01)
*G06F 11/36* (2006.01)

(52) U.S. Cl.
CPC .............. *G06F 1/26* (2013.01); *G06F 11/364* (2013.01); *G06F 11/3636* (2013.01)

(58) Field of Classification Search
CPC ......... H03K 19/018521; H03K 17/223; H03K 17/6872; H03K 17/687; G06F 1/32; G06F 1/263; G05F 1/263

USPC ..... 713/320, 323; 327/306, 333; 714/30, 37, 714/11.029

See application file for complete search history.

(56) References Cited

U.S. PATENT DOCUMENTS

| 5,479,652 | A | 12/1995 | Dreyer et al. | |
|---|---|---|---|---|
| 8,448,001 | B1 * | 5/2013 | Zhu ........................ | G06F 1/3206 713/320 |
| 8,826,047 | B1 * | 9/2014 | Zhu ........................ | G06F 1/3206 713/300 |
| 8,868,941 | B2 * | 10/2014 | Jayasimha ............ | G06F 1/3287 703/18 |
| 8,966,313 | B2 * | 2/2015 | Truong ............... | G06F 11/3656 714/30 |

FOREIGN PATENT DOCUMENTS

JP  H05-334114  12/1993

* cited by examiner

*Primary Examiner* — Dinh T Le

(57) ABSTRACT

An IC chip includes at least two power supply domains, and an isolator configured to have a bridge function and a trace function. (a) The bridge function passes a signal on a bus in one of the two power supply domains to a bus in the other of the two power supply domains when turning on power supply in both of the two power supply domains; and (b) the two power supply domains are a first power supply domain and a second power supply domain, and the trace function traces actions of a circuit in the second power supply domain when turning off power supply in the first power supply domain and turning on power supply in the second power supply domain.

4 Claims, 1 Drawing Sheet

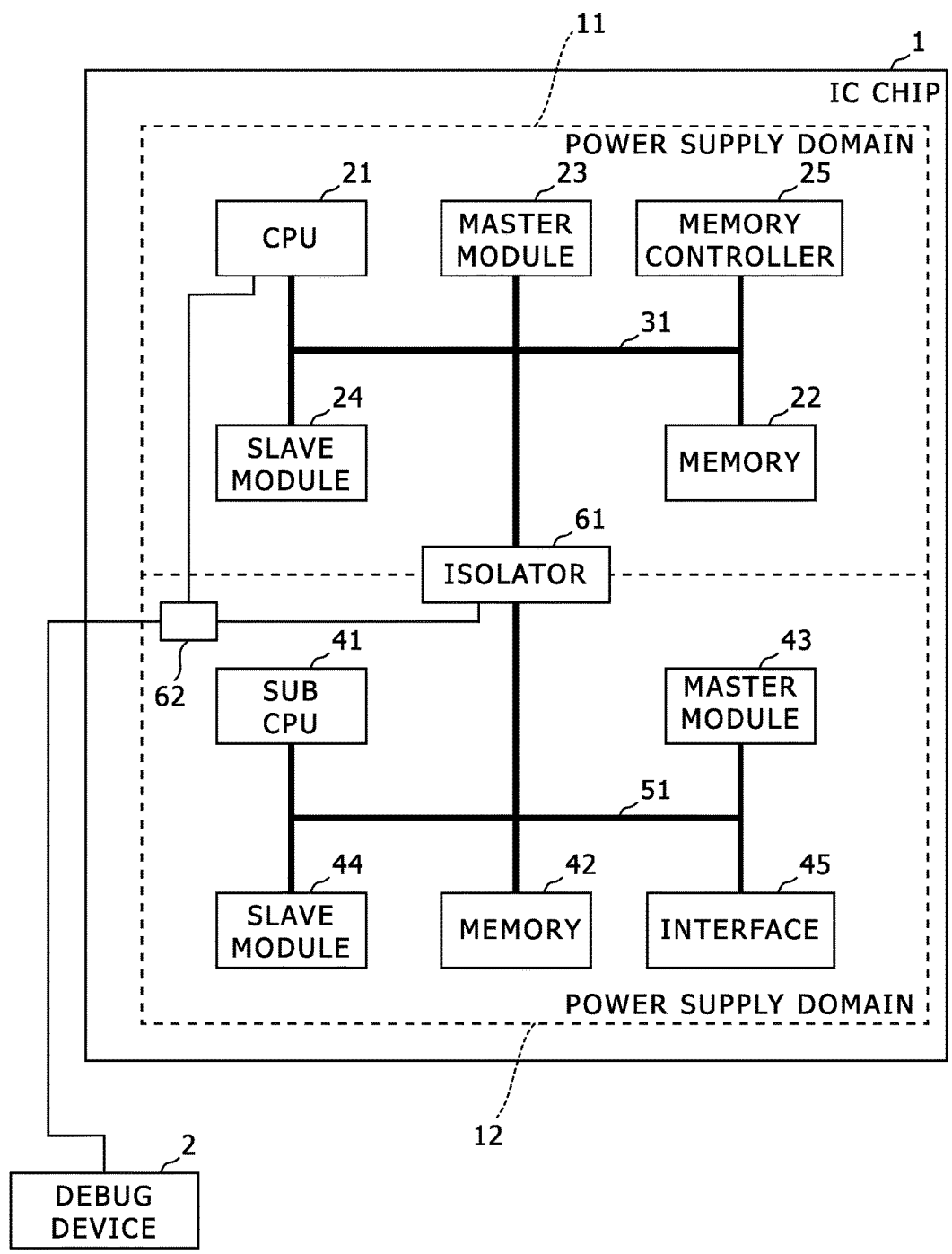

IC CHIP

CROSS-REFERENCE TO RELATED APPLICATIONS

This application relates to and claims priority rights from Japanese Patent Application No. 2015-127622, filed on Jun. 25, 2015, the entire disclosures of which are hereby incorporated by reference herein.

BACKGROUND

1. Field of the Present Disclosure

The present disclosure relates to an IC chip.

2. Description of the Related Art

When debugging an IC (Integrated Circuit) chip such as a system LSI (Large Scale Integrated circuit) that includes a processor, trace and debug are sometimes performed using an In-Circuit Emulator (ICE).

When using an In-Circuit Emulator, a JTAG (Joint Test Action Group) interface, a specific-purpose interface or the like is usually used for connection and data transmission between the In-Circuit Emulator and the IC chip.

An IC chip has plural power supply domains, and power supply in a power supply domain can be turned on or off independently from another power supply domain.

For example, in an electronic apparatus, in a sleep mode, power supply is turned on in a part of the power supply domains and power supply is turned off in the residual part of the power supply domains. Consequently, power consumption is reduced.

In an IC chip that has such plural power supply domains, when turning off in a sleep mode power supply to a processor enabled to be traced, it is difficult to trace circuit actions in a power supply domain that power supply is turned off in the sleep mode.

SUMMARY

An IC chip according to an aspect of the present disclosure includes at least two power supply domains, and an isolator configured to have a bridge function and a trace function. (a) The bridge function passes a signal on a bus in one of the two power supply domains to a bus in the other of the two power supply domains when turning on power supply in both of the two power supply domains; and (b) the two power supply domains are a first power supply domain and a second power supply domain, and the trace function traces actions of a circuit in the second power supply domain when turning off power supply in the first power supply domain and turning on power supply in the second power supply domain.

These and other objects, features and advantages of the present disclosure will become more apparent upon reading of the following detailed description along with the accompanied drawings.

BRIEF DESCRIPTION OF THE DRAWINGS

FIG. 1 shows a block diagram that indicates a configuration of an IC chip according to an embodiment of the present disclosure.

DETAILED DESCRIPTION

Hereinafter, an embodiment according to an aspect of the present disclose will be explained with reference to a drawing.

FIG. 1 shows a block diagram that indicates a configuration of an IC chip according to an embodiment of the present disclosure. As shown in FIG. 1, when debugging an IC chip 1, a debug device 2 such as an In-Circuit Emulator is connected to the IC chip 1.

Further, the IC chip 1 is a chip such as an LSI (Large Scale Integration) or an ASIC (Application Specific Integrated Circuit) that has plural power supply domains 11 and 12.

The IC chip 1 includes, in the power supply domain 11, a CPU (Central Processing Unit) 21, a memory 22 such as a RAM (Random Access Memory), a master module 23 that performs communication with slave modules 24 and 44 and performs a predetermined process, the slave module 24 that performs a process requested by the master module 23 or a master module 43, a memory controller 25 connected to an external memory such as a RAM, and a bus 31. The bus 31 is a bus in the power supply domain 11, and is a transmission path used for communication among circuits such as the CPU 21, the memory 22, the master module 23, the slave module 24, and the memory controller 25 in the power supply domain 11.

Further, the IC chip 1 includes, in the power supply domain 12, a sub CPU 41, a memory 42 such as a RAM, the master module 43 that performs communication with the slave modules 24 and 44 and performs a predetermined process, the slave module 44 that performs a process requested by the master module 23 or 43, a memory controller 45 connected to a peripheral device, and a bus 51. The bus 51 is a bus in the power supply domain 12, and is a transmission path used for communication among circuits such as the CPU 41, the memory 42, the master module 43, the slave module 44, and the interface 45 in the power supply domain 12.

The CPU 21 in the power supply domain 11 is a main processor that uses each circuit in the power supply domains 11 and 12 and thereby performs a process described in a program. The sub CPU 41 in the power supply domain 12 is a sub processor that uses each circuit in the power supply domain 12 and thereby performs a process described in a program. The CPU 21 controls each circuit in the power supply domains 11 and 12 and thereby performs a process described in a program. The sub CPU 41 controls each circuit in the power supply domain 12 and thereby performs a process described in a program. The CPU 21 is a large scale circuit and has a trace function, but the sub CPU 41 is a small scale circuit and has no trace functions. Thus, the power supply domain 12 includes no processors having a trace function.

In a sleep mode, power supply is turned off in the power supply domain 11, and power supply is turned on in the power supply domain 12. In a normal mode (i.e. non-sleep mode), power supply is turned on in both of the power supply domains 11 and 12.

Further, the IC chip 1 includes an isolator 61. The isolator 61 has a bridge function and a trace function. (a) The bridge function passes a signal on a bus (the bus 31 or 51) in one of the two power supply domains 11 and 12 to a bus (the bus 31 or 51) in the other of the two power supply domains 11 and 12 when turning on power supply in both of the two power supply domains 11 and 12. (b) The trace function traces actions of a circuit in the power supply domain 12 when turning off power supply in the power supply domain 11 and turning on power supply in the power supply domain 12 (i.e. in the sleep mode). As the buses 31 and 51, generic buses may be used.

Thus, the isolator 61 (a) relays communication between the master module 23 and the slave module 44 when turning on power supply in both of the power supply domains 11 and 12, and (b) performs communication with the slave module 44 in order to trace the slave module 44 when turning off power supply in the power supply domain 11 and turning on power supply in the power supply domain 12.

Here the isolator 61 has, as the trace function, the same functions as read and write functions of the master modules 23 and 43. Therefore, in the sleep mode, the isolator 61 can read and write a value of a register in a circuit included in the power supply domain 12. Consequently, when debugging in the sleep mode, the debug device 2 can set a value to a register in a circuit included in the power supply domain 12 using a write command through a JTAG interface or the like, and can obtain a value of a register in a circuit included in the power supply domain 12 using a read command.

Further, when turning off power supply in the power supply domain 11 and turning on power supply in the power supply domain 12, the isolator 61 electrically isolates the bus 31 in the power supply domain 11 and the bus 51 in the power supply domain 12 from each other.

Furthermore, the isolator 61 (a) relays communication between the master module 43 and the slave module 24 when turning on power supply in both of the power supply domains 11 and 12, and (b) transmits to the master module 43 a pseudo response to communication from the master module 43 toward the slave module 24 when turning off power supply in the supply domain 11 and turning on power supply in the power supply domain 12.

For example, if the communication from the master module 43 toward the slave module 24 is a read command, then as the pseudo response, a predetermined value (i.e. a fixed value) is transmitted; and for example, if the communication from the master module 43 toward the slave module 24 is a write command, then as the pseudo response, an acknowledgement of completing a write action is transmitted.

Consequently, when debugging in the sleep mode, even if a signal is improperly transmitted from the master module 43 toward the slave module 24 due to a program error or the like, this signal is received by the isolator 61, and a pseudo response is transmitted from the isolator 61 to the master module 43. Therefore, when debugging in the sleep mode, even if an access occurs to the slave module 24 in the powered-off power supply domain 11, dead lock does not occur due to waiting a response.

Further, the IC chip 1 includes a debug interface 62 in the power supply domain 12. The debug interface 62 is, for example, a JTAG interface or a specific-purpose interface, and is an internal circuit that outputs trace data outputted from the CPU 21 or the isolator 61 to the external debug device 2.

When debugging in the normal mode, the CPU 21 outputs trace data to the debug interface 62 while running a program. This trace data includes a value of a register or the like in the CPU 21, the master module 23 or 43, the slave module 24 or 44 or the like. When debugging in the sleep mode, the isolator 61 obtains trace data and outputs the trace data to the debug interface 62 while the sub CPU 41 is running a program. This trace data includes a value of a register or the like in the master module 43, the slave module 44 or the like.

Thus, when turning on power supply in both of the power supply domains 11 and 12, the CPU 21 communicates through the debug interface 62 with the external debug device 2; and when turning off power supply in the power supply domain 11 and turning on power supply in the power supply domain 12, the isolator 61 communicates through the debug interface 62 with the external debug device 2.

The following part explains a behavior of the aforementioned IC chip 1 when debugging.

(a) Debugging in the Normal Mode (i.e. Non-Sleep Mode)

In the normal mode (non-sleep mode), power supply is turned on in all the power supply domains 11 and 12, and therefore the debug device 2 provides trace data (here a command or the like) through the debug interface 62 to the CPU 21, and obtains trace data (here a log as an action result or the like) through the debug interface 62 from the CPU 21. In this process, the CPU 21 acts in accordance with the command provided from the debug device 2, and thereby performs a process specified by this command using a circuit in the power supply domains 11 and 12.

(b) Debugging in the Sleep Mode

In the sleep mode, power supply is turned off in the power supply domain 11 and turned on in the power supply domain 12, and therefore the debug device 2 provides trace data (here a command or the like) through the debug interface 62 to the isolator 61, and obtains trace data (here a log of a register value as a corresponding action result or the like) through the debug interface 62 from the isolator 61. In this process, the sub CPU 41 automatically acts, and the isolator 61 performs a read action/a write action from/to a circuit in the power supply domain 12 in accordance with the command provided from the debug device 2, and thereby obtains the trace data.

In the aforementioned embodiment, the isolator 61 has a bridge function and a trace function. (a) The bridge function passes a signal on a bus in one of the two power supply domains 11 and 12 to a bus in the other of the two power supply domains 11 and 12 when turning on power supply in both of the two power supply domains 11 and 12. (b) The trace function traces actions of a circuit in the power supply domain 12 when turning off power supply in the power supply domain 11 and turning on power supply in the power supply domain 12.

Consequently, the IC chip is obtained, even when turning off in a sleep mode power supply to a processor enabled to be traced, so as to trace circuit actions in a power supply domain that power supply is turned off in the sleep mode.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An IC chip, comprising:
   at least two power supply domains;
   an isolator configured to have a bridge function and a trace function; wherein (a) the bridge function passes a signal on a bus in one of the two power supply domains to a bus in the other of the two power supply domains when turning on power supply in both of the two power supply domains; and (b) the two power supply domains are a first power supply domain and a second power supply domain, and the trace function traces actions of a circuit in the second power supply domain when turning off power supply in the first power supply domain and turning on power supply in the second power supply domain; and
   a main processor in the first power supply domain; wherein the main processor communicates with an external debug device when turning on power supply in both of the first and the second power supply domains, and the isolator communicates with the external debug device when turning off power supply in the first power supply domain and turning on power supply in the second power supply domain.

2. The IC chip according to claim 1, further comprising a master module in the first power supply domain; and a slave module in the second power supply domain; wherein the isolator (a) relays communication between the master module and the slave module when turning on power supply in both of the first and the second power supply domains; and (b) performs communication with the slave module in order to trace the slave module when turning off power supply in the first power supply domain and turning on power supply in the second power supply domain.

3. The IC chip according to claim 1, further comprising a slave module in the first power supply domain; and a master module in the second power supply domain; wherein the isolator (a) relays communication between the master module and the slave module when turning on power supply in both of the first and the second power supply domains; and (b) transmits to the master module a pseudo response to communication from the master module toward the slave module when turning off power supply in the first power supply domain and turning on power supply in the second power supply domain.

4. The IC chip according to claim 1, wherein the isolator electrically isolates a bus in the first power supply domain and a bus in the second power supply domain from each other when turning off power supply in the first power supply domain and turning on power supply in the second power supply domain.

* * * * *